(12) United States Patent
Hougham et al.

(10) Patent No.: US 6,783,717 B2
(45) Date of Patent: Aug. 31, 2004

(54) PROCESS OF FABRICATING A PRECISION MICROCONTACT PRINTING STAMP

(75) Inventors: Gareth Hougham, Ossining, NY (US); Peter Fryer, Yorktown Heights, NY (US); Ronald Nunes, Hopewell Junction, NY (US); Mary Beth Rothwell, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 10/127,373

(22) Filed: Apr. 22, 2002

(65) Prior Publication Data

US 2003/0197312 A1 Oct. 23, 2003

(51) Int. Cl.⁷ .............................................. B29C 33/40
(52) U.S. Cl. ...................................... 264/219; 264/225
(58) Field of Search ............................... 264/219, 220, 264/225

(56) References Cited

U.S. PATENT DOCUMENTS 5,776,748 A * 7/1998 Singhvi et al. ............. 435/180
6,048,623 A * 4/2000 Everhart et al. ............ 428/464

OTHER PUBLICATIONS

Kumar et al., Appl. Phys. Lett., 63, (14), 2002–2004 (Oct. 1993).
Hidber et al., Langmuir, 12, 1375–1380 (1996).

* cited by examiner

*Primary Examiner*—Allan R. Kuhns
(74) *Attorney, Agent, or Firm*—Schlly, Scott, Murphy & Presser; Daniel P. Morris, Esq.

(57) ABSTRACT

A process of making a high precision microcontact printing stamp in which an elastomeric monomer or oligomer is introduced into a mold wherein a photoresist master imprinted with a microcircuit design in negative relief is predisposed. The monomer or oligomer is cured at a temperature no higher than about ambient temperature whereby a distortion-free microcontact printing stamp having the microcircuit design of the photoresist master in positive relief is formed.

12 Claims, 2 Drawing Sheets

PROCESS OF FABRICATING A PRECISION MICROCONTACT PRINTING STAMP

BACKGROUND OF THE DISCLOSURE

1. Field of the Invention

The present invention is directed to a formation of a microcontact printing stamp employed in the creation of microcircuitry where dimensional integrity and registration must be maintained at the micron level over very large distances that may be as long as half a meter. More particularly, the present invention is directed to a process of preparing a high precision microcontact printing stamp wherein monomeric shrinkage is compensated for by low temperature curing.

2. Background of the Prior Art

The process of microcontact printing, to create a very fine pitch pattern, is of recent vintage in the art of fabricating microcircuitry. This process is described in Kumar et al., *Appl. Phys. Lett.*, 63 (14), 2002–2004 (October 1993) and Hidber et al., *Langmuir*, 12, 1375–1380 (1996). This process, which represents an alternative to photolithography in the fabrication of electronic components, especially where extremely fine line dimensions are required, requires the creation of a very fine pitch rubber stamp.

The very fine pitch rubber stamp utilized in microcontact printing is most often formed of an elastomeric material which is preferably silicone rubber. Those skilled in the art are aware that the term "silicone rubber" denotes polydimethylsiloxane (PDMS). In the current method of preparing rubber stamps used in high precision microcontact printing liquid, PDMS is introduced into a mold wherein a negative relief microcircuit pattern is expressed. The polymer is thereupon cured to produce a solidified rubber stamp which is removed from the mold. The solidified rubber stamp has a microcircuit pattern expressed in positive relief. It is this pattern that is transferred to a substrate in subsequent steps in the microcontact printing process.

The positive relief pattern provided on the rubber stamp is thereupon inked onto a substrate. Although there are several variations of microprinting methodology, commonly, the substrate is blanket coated with a thin gold film and the gold coated substrate is inked with an alkane thiol material transferred thereto by the stamp. Commonly, the alkane thiol material has the structural formula $CH_3-(CH_2)_{18}-CHSH_2$. It should, of course, be appreciated that other alkane thiol materials, as well as other inks, can be substituted for this alkane thiol.

Upon contact of the positive relief pattern of the stamp with the gold film, a monolayer of the ink, preferably an alkane thiol, having the desired microcircuit pattern, is transferred to the gold film layer. Alkane thiols form an ordered monolayer on gold by a self assembly process. Thus, a self assembled monolayer (SAM) of the desired pattern is formed on the gold layer. The SAM is tightly packed and well adhered to the gold. As such, the SAM acts as an etch resist upon the contact of a gold etching solution onto the stamped gold coated substrate.

In the next step, the inked substrate is immersed in a gold etching solution and all but the SAM is etched away to underlying layers below the gold layer. The SAM, which is invulnerable to the etch solution, is then stripped away leaving gold in the desired pattern.

The aforementioned description is set forth in the Kumar et al. technical article. The Hidber et al. technical article utilizes a different procedure wherein the aforementioned rubber stamp is inked with a palladium catalyst and a pattern is again stamped onto a substrate. The positive relief microcircuit pattern of palladium catalyst is subsequently immersed in an electroless plating solution which induces the desired microcircuit pattern by electroless plating.

The aforementioned description makes it apparent that faithful reproduction of the microcircuit pattern of the printing stamp onto the substrate is critical, especially when the pattern is of both fine pitch and of very large overall dimensions. For example, if microcontact printing is used to produce microcircuitry on flat panel displays, it may require 5 micron sized features to be accurately registered to one another within 1 micron across a linear distance of 15 inches.

In turn, faithful reproduction of the microcircuit onto the substrate requires the fabrication of a microcontact printing stamp that faithfully reproduces the desired microcircuit. This challenge to produce a high precision microcircuit printing stamp is magnified by the additional requirement that this formation of a microcontact printing stamp be simple and cost effective. This latter requirement is emphasized because a primary application of this technology is the manufacture of flat panel displays. Flat panel displays must be produced at low cost and yet must meet the stringent tolerance criteria mentioned above.

In the past microcontact printing could not meet this challenge. This was because microcontact printing stamps could not satisfy the registration requirement because of shrinkage during their preparation. That is, the elastomeric polymer would shrink during its curing in the mold. As those skilled in the art are aware, when an elastomeric polymer, such as silicone rubber, cures in a mold it shrinks in an amount of between about 0.1% to about 4%.

Thus, it is apparent that there is a strong need in the art for a new microcontact printing stamp forming process that provides a stamp that provides good registration by compensating for the shrinkage that occurs during curing in the mold.

BRIEF SUMMARY OF THE INVENTION

A new process has now been developed which results in the formation of a high precision microcontact printing stamp providing a positive relief microcircuit pattern faithful to the dimensional requirements of the desired microcircuit.

In accordance with the present invention a process of fabricating a high precision microcontact printing stamp is provided. In this process an elastomeric monomer or oligomer is introduced into a mold housing in which a photoresist master, defining a microcircuit in negative relief, disposed on a substrate, is situated above a stamp backplane. The mold housing containing the elastomeric monomer or oligomer is allowed to cure at ambient temperature for a period of about 4 days to about 1 week. A molded product is removed from the mold housing and the photoresist master is peeled away to provide a high precision microcontact printing stamp expressing the microcircuit in positive relief having significantly lower distortion than heretofore available.

In further accordance with the present invention a second embodiment of the process of fabricating a microcontact printing stamp, identical to the first embodiment but for the temperature at which curing occurs, is provided. Whereas curing in the first embodiment takes place at ambient temperature, curing in the second embodiment occurs at a temperature between about 1° C. and about 5° C. below ambient temperature for a period of between about 5 days and about 1 week. This process produces a high precision microcontact printing stamp having almost no detectable distortion.

Yet a third embodiment of the process of the present invention is one in which the process of the second embodiment is repeated but for the further requirement that the elastomeric polymer be photocurable. In this process the photocurable elastomeric polymer is exposed to the same temperature utilized in the second embodiment but, in addition, the polymer in the mold is exposed to ultraviolet light. The microcontact printing stamp product of the process of the third embodiment is substantially identical to that of the second embodiment but for the rate of curing. Whereas the second embodiment cures in a period of between about 5 days and about 1 week, the process of the third embodiment cures within a period of between about 30 seconds and about 1 hour.

BRIEF DESCRIPTION OF THE DRAWINGS

The present invention may be better understood by reference to the accompanying drawings of which.

DETAILED DESCRIPTION

Figure 1:
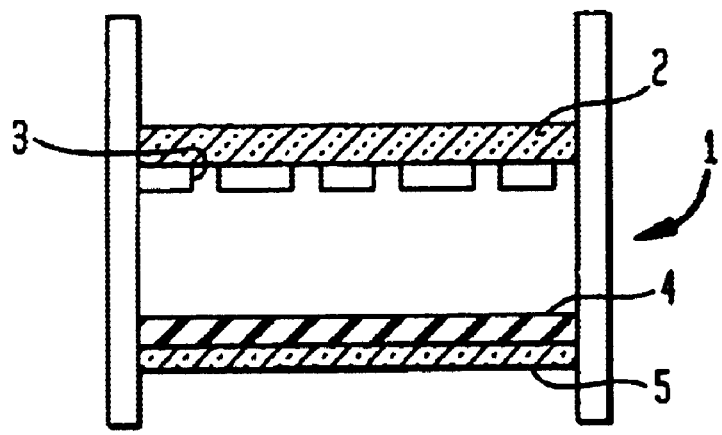
FIG. 1 is a sectional elevation view of a mold housing prior to introduction of an elastomeric monomer.

The recently developed process of microcontact printing, often called "soft-lithography," requires the preparation of a very fine pitch pattern on the surface of a rubber stamp. It is to the preparation of such a stamp that the present invention is directed. The process of preparing a very fine pitch pattern on the surface of rubber stamp occurs in a molding operation. In this molding operation a mold housing 1, in which a flexible stamp backplane 4, usually formed of a rubber-like material, such as polydimethylsiloxane, natural rubber, vulcanized rubber, butadiene rubber, polyurethane rubber, polyepoxy rubber, acrylic rubber, polyphosphazine rubber and the like, is predisposed, is utilized. The flexible backplane 4 is disposed on a temporary substrate 5 Temporary substrate 5 may be any metal, ceramic, glass or plastic which does not react with the monomer or oligomer disposed in the mold and which maintains the backplane 4 flat and rigid. Of the materials employed as the temporary substrate 5, a glass plane is particularly preferred.

In addition to the predisposition of the backplane 4 in mold housing 1, a photoresist master 3, expressing a microcircuit in negative relief, disposed on a substrate 2, is also predisposed in the mold housing 1 above the backplane 4. Substrate 2 is any smooth metal, plastic, ceramic or glass. In a preferred embodiment, the substrate 2 is a glass plane.

A liquid elastomeric monomer or oligomer 6, which is curable to a solid elastomeric, is introduced into the mold housing 1. In a particularly preferred embodiment the elastomeric monomer or oligomer, which is thereupon crosslinked, is dimethylsiloxane or an oligomer thereof so that the product elastomer is silicone rubber, another name for polydimethylsiloxane (PDMS). This is not to say that other monomer and oligomer precursors of elastomeric materials cannot be employed in the process of the present invention.

The elastomeric monomer or oligomer 6, which generally encompasses catalysts, promoters and the like, is introduced into the mold so that it fills the space between the photoresist master 3 and the backplane 4.

The advance in the art of the present invention is the reduction in temperature during curing. In the prior art, curing of typical elastomeric monomers, such as dimethylsiloxane, took place at a temperature of approximately 60° C. Curing of typical elastomeric monomers, at this typical temperature, occurs over a period of from about 10 minutes to about 4 hours. More preferably, curing occurs over a period of between about 30 minutes and about 2 hours. Although this curing process is commercially viable, the elastomeric product of this molding process, a microcontact stamp, has never attained commercial viability because of the shrinkage resulting from the decrease in volume resulting from the conversion of the elastomeric monomer or oligomer into an elastomeric polymer that occurred during crosslinkage as well as the further shrinkage resulting from the cooling of the elastomer to ambient temperature. Suffice it to say, the product microcontact stamp 8, when fabricated in accordance with prior art processing, is typically depicted in FIG. 4. For this reason, microcontact printing stamps have not been commercially developed and soft lithography has not yet been able to compete with photolithography in the fabrication of electronic components having extremely fine line dimensions.

Although it is indisputable that printing stamps molded at the usual curing temperature of elastomeric monomers, e.g. about 60° C., are unacceptable because of the aforementioned shrinkage, this identification of the cause of the problem did not, in the prior art, suggest its solution. However, it is apparent that if a process were developed wherein shrinkage could be compensated for, so that there would be no net change in volume of the elastomeric stamp, the dimensions of the originally designed microcircuitry would be maintained and the problems of the prior art would be overcome.

Figure 5:
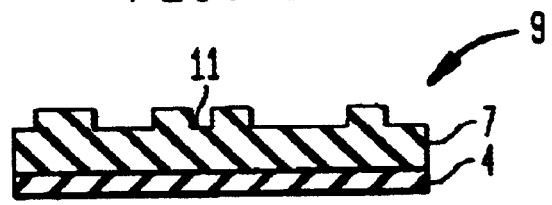
FIG. 5 is a schematic sectional representation of the high precision microcontact printing stamp produced in accordance with the process of the present invention.

In a first embodiment of the present invention, which operates on the above theory, the temperature of the elastomeric monomer or oligomer introduced into a mold is ambient temperature, e.g. about 20° C. to about 22° C. Because of this reduced temperature, the duration of curing is extended to a period of about 4 days to about 1 week. Upon completion of this curing period, a molded microcircuit printing stamp product is recovered. As illustrated in FIG. 5, printing stamp 9 includes the elastomeric product 7, which includes the microcircuit pattern 11 in positive relief, provided by photoresist master 3, in negative relief, and backplane 4.

Figure 4:
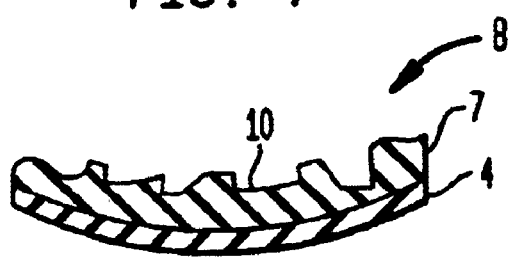
FIG. 4 is a schematic sectional representation of a microcontact printing stamp produced in accordance with prior art processing.

The microcontact stamp 9 represents a significant improvement over prior art designs, such as that depicted by microcontact stamp 8. The stamp 8, prepared at normal curing temperatures, e.g. between about 40° C. and about 80° C., is characterized by shrinkage, as depicted in FIG. 4. On the other hand, microcontact stamp 9, produced by curing at ambient temperature, eliminates considerable shrinkage caused by cooling from the curing temperature to ambient temperature. This shrinkage is quantifiably calculated by multiplying the coefficient of thermal expansion by the number of degrees of temperature that the elastomeric must be cooled. Insofar as this shrinkage, due to thermal contraction, approximates the degree of shrinkage noted in stamp products prepared at usual curing temperatures, curing of the elastomeric stamp product at ambient temperature substantially solves the shrinkage problem of prior art microcontact printing stamps. Specifically, a typical elastomer has a coefficient of thermal expansion in the range of approximately 800 ppm/° C. Thus, when this coefficient is multiplied by the temperature reduction, from curing to ambient temperature, a shrinkage in the range of between about 0.1% and about 4% is obtained.

In a second preferred embodiment of the process of the present invention the process of the first embodiment is identically practiced but for the reduction in curing temperature from ambient to a temperature in the range of between about 1° C. and about 5° C. below ambient. This somewhat lower cure temperature extends the period over which curing occurs to a range of between about 5 days and about 1 week. More preferably, the curing temperature is about 3° C. below ambient. Thus, if ambient temperature is deemed to be about 20° C., curing in this second preferred embodiment occurs at a temperature in the range of between about 15° C. and about 19° C., more preferably, about 17° C.

The product of the second preferred embodiment is, because of below ambient curing temperature, substantially free of shrinkage since the product printing stamp 9 expands slightly, in raising to ambient temperature, to compensate for shrinkage associated with crosslinkage, so that the net result is a high precision printing stamp whose microcircuitry 11 pattern corresponds almost exactly to the microcircuitry of the photoresist master 3. That is, the microcircuitry pattern 11 of microcircuit printing stamp 9 has no detectable distortion vis a vis the photoresist master 3.

The third preferred embodiment of the process of the present invention eliminates a detrimental characteristic of the second embodiment. That is, the duration of curing in the second embodiment is in the range of between about 5 days and about 1 week. A significant reduction in time of curing would thus be highly desirable from the point of view of commercial viability. It is to the reduction in curing time that the third embodiment is particularly addressed.

In the third embodiment of the process of the present invention the second embodiment is reproduced in terms of curing temperature. That is, curing temperature is again sub-ambient. However, the elastomeric monomer is limited to one which is photochemically curable. In a preferred embodiment, the photochemically curable elastomer monomer is a photocurable dimethylsiloxane.

In view of the above modification, the curing process of the second embodiment is further modified by exposing the mold housing 1, containing the curable monomer or oligomer 6, to a source of ultraviolet light. Obviously, the mold housing 1, in this embodiment, must be transparent to the transmission of ultraviolet light.

The process of the third embodiment, like the process of the second embodiment, permits the microcontact stamp 9 to remain in the mold, subsequent to curing, for the short time necessary for the stamp 9 to warm to ambient temperature from the sub-ambient temperature at which it is cured.

As stated above, the advantage of this embodiment is the shortened period of time required for curing. Whereas curing, in accordance with the second embodiment, occurs over a period of about 5 days to about 1 week, curing in this third embodiment, wherein a photocurable monomer or oligomeric system is employed, occurs over a period of about 5 minutes to about 1 hour. More preferably, curing time ranges from about 10 minutes to about 30 minutes.

Figure 2:
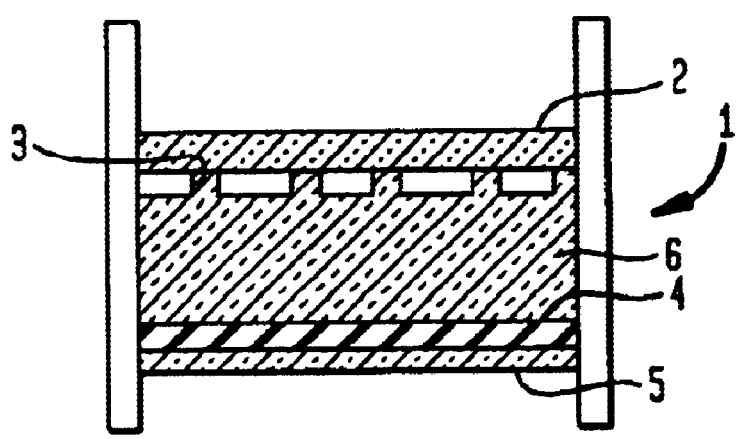
FIG. 2 is a sectional elevation view of a mold housing after the introduction of an elastomeric monomer.
Figure 3:
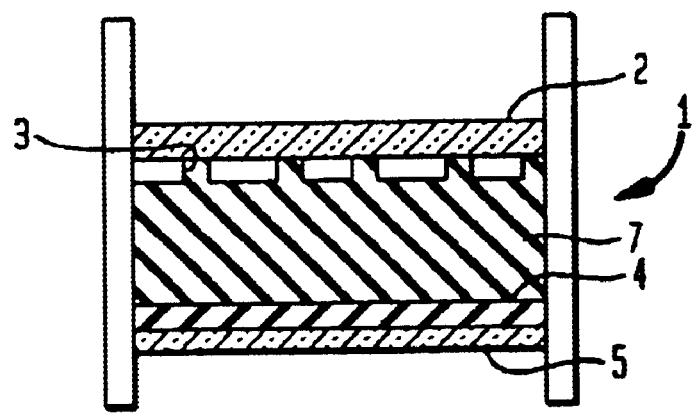
FIG. 3 is a sectional elevation view of a mold housing after curing of the elastomeric monomer.

It is noted that in all three preferred embodiments accurate control of the curing temperature is of the utmost importance. Therefore, in a preferred embodiment of all three embodiments of the present invention, the step of curing the curable elastomeric monomer occurs under isothermal conditions. This may be obtained by hermetically sealing the monomer or oligomer charged mold, e.g. FIG. 2, in a controlled temperature environment such as a temperature controlled liquid bath. In a preferred embodiment this temperature controlled liquid bath is a water bath. It is particularly preferred that curing temperature be controlled to within 0.1° C. of the desired temperature.

The above embodiments are provided to illustrate the scope and spirit of the present invention. These embodiments will make apparent, to those skilled in the art, other embodiments and examples. Those other embodiments and examples are within the contemplation of the present invention. Therefore the present invention should be limited only by the appended claims.

What is claimed is:

1. A process for making a microcontact printing stamp comprising the steps of:

predisposing a photoresist master having a microcircuit design in negative relief above a flexible stamp backplane in a mold;

introducing a liquid elastomeric monomer or oligomer mixture into said mold so that said monomer or oligomer fills the space between said photoresist master and said flexible stamp backplane;

curing said liquid elastomeric monomer or oligomer to form an elastomeric polymer at a temperature which is within a predetermined temperature range below an ambient temperature; and removing a cured elastomeric printing stamp, disposed on said flexible backplane, whose top surface conforms to the microcircuit design of said photoresist master.

2. A process in accordance with claim 1 wherein said curing temperature is within the range between about 1° C. and about 5° C. below said ambient temperature.

3. A process in accordance with claim 2 wherein said curing temperature is about 3° C. below ambient temperature.

4. A process in with claim 2 wherein said elastomeric monomer is photocurable, said mold is transparent to ultraviolet light and said step of curing occurs while said elastomeric monomer or oligomer is exposed to ultraviolet light.

5. A process in accordance with claim 1 wherein said curing step occurs under isothermal conditions.

6. A process in accordance with claim 5 wherein said mold is hermetically sealed and immersed in constant temperature liquid environment during curing.

7. A process in accordance with claim 6 where said constant temperature environment is a liquid bath.

8. A process in accordance with claim 7 wherein said liquid bath is a water bath.

9. A process in accordance with claim 2 wherein said step of removing said stamp from said mold occurs subsequent to the warming of said stamp to ambient temperature.

10. A process in accordance with claim 1, wherein said ambient temperature lies within a range of about 15° C. to 25° C.

11. A process in accordance with claim 1, wherein said ambient temperature is about 20° C., and said curing is effected within a temperature range of about 15° C. to 19° C.

12. A process in accordance with claim 11, wherein said curing is effected at a temperature of about 17° C.

* * * * *

UNITED STATES PATENT AND TRADEMARK OFFICE
CERTIFICATE OF CORRECTION

PATENT NO. : 6,783,717 B2
DATED : August 31, 2004
INVENTOR(S) : Kerry Bernstein et al.

It is certified that error appears in the above-identified patent and that said Letters Patent is hereby corrected as shown below:

Title page,
Item [74], *Attorney, Agent, or Firm*, "Schully, Scott, Murphy & Presser" should read
-- Scully, Scott, Murphy & Presser --

Column 6,
Line 38, "A process in with claim" should read -- a process in accordance with claim --

Signed and Sealed this

Seventh Day of June, 2005

JON W. DUDAS
*Director of the United States Patent and Trademark Office*